Feb. 18, 1947.  O. E. BUCKLEY  2,415,808

DETECTION OF LARGE MAGNETIC BODIES

Filed July 31, 1941  2 Sheets-Sheet 1

INVENTOR
O. E. BUCKLEY
BY
Earl C. Laughlin
ATTORNEY

Patented Feb. 18, 1947

2,415,808

UNITED STATES PATENT OFFICE 2,415,808

DETECTION OF LARGE MAGNETIC BODIES

Oliver E. Buckley, Maplewood, N. J., assignor to Bell Telephone Laboratories, Incorporated, New York, N. Y., a corporation of New York Application July 31, 1941, Serial No. 404,760

1 Claim. (Cl. 175—183)

The invention relates to detecting and locating large bodies of magnetic material, and its object is to accomplish this in an efficient manner and with a high degree of accuracy employing comparatively simple and economical apparatus.

The invention is particularly applicable to the detection and location of submerged submarine or other vessels having hulls of magnetic material but it is applicable as well to the detection and location of other magnetic bodies, such as large magnetic ore deposits.

It is known that the earth's magnetic field at any given point is materially affected by the proximity of large masses of magnetic material. This fact is made use of in the detecting circuits of the invention which effectively compare the conditions of the earth's magnetic field at separated points for the purpose of detecting any relative variations at these points which might be caused by the proximity of a large magnetic body, and thus providing data which may be employed in the determination of the location of that body.

In one embodiment, the circuits of the invention make use of two pulse generators each employing an impulse coil of the saturable magnetic core type for generating equivalent electrical pulses. The impulse coils of these generators are located in spaced relation with respect to each other and are subjected to steady polarization by the earth's magnetic field. An associated circuit continuously compares the pulses generated by the two generators and detects and measures variations in their relative time of occurrence caused by a relative change in the polarizations of the two coils when the strength and direction of the earth's magnetic field at their respective points of location differ because of the effect of a nearby large magnetic body.

Figure 1:
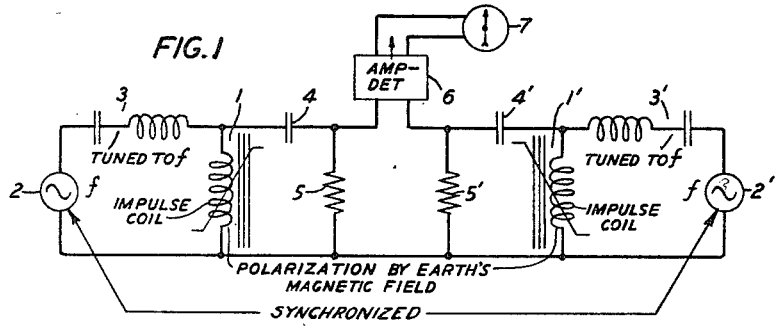
Figure 2:
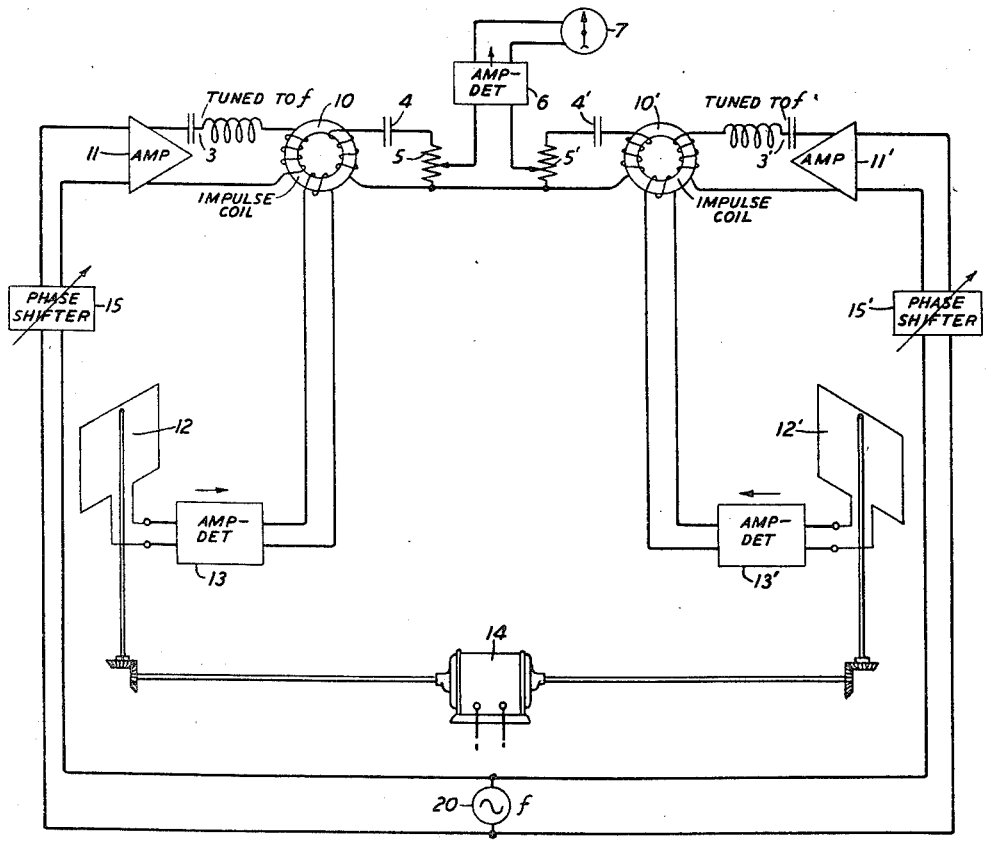
Figure 3:
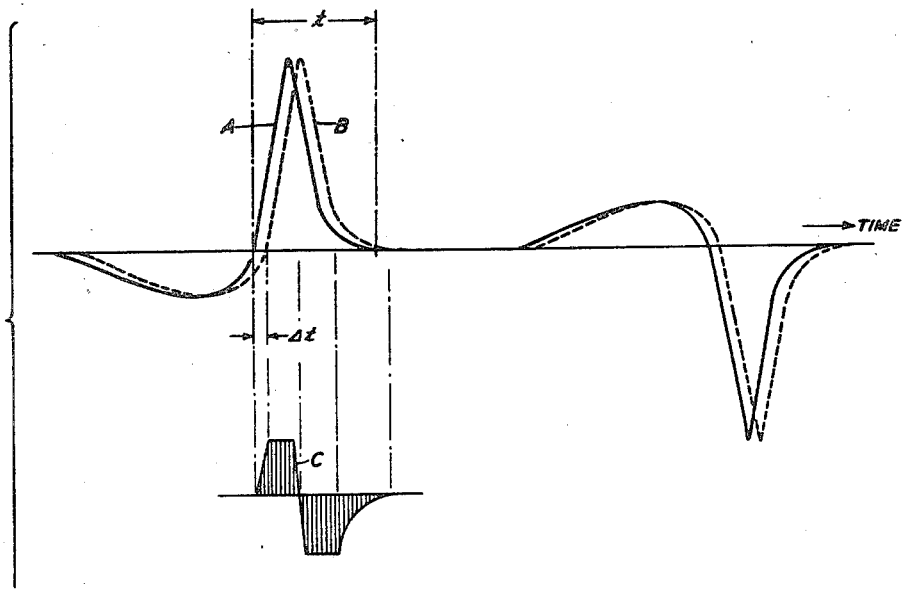

The various objects and features of the invention will be understood from the following detailed decription when read in conjunction with the accompanying drawings in which:

Figs. 1 and 2 show schematically two different modifications of the detecting circuits of the invention; and Fig. 3 shows curves which are used to explain the operation of these circuits.

The U. S. Patents Nos. 2,117,752, issued May 17, 1938, to L. R. Wrathall and 2,150,386, issued March 14, 1939, to J. M. Manley, describe the circuits and the characteristics of harmonic generators which are particularly suitable for use as the pulse generators in the circuits of the present invention. The generator disclosed in these patents comprises an induction coil having a saturable magnetic core, excited by a source of sinusoidal oscillations of a given fundamental frequency, and an output circuit including a capacitor and a resistive impedance in series connected across the coil. With such a circuit it is found that when the exciting source drives the coil through its saturating point a sharp voltage peak will be produced in the resistive impedance in the output circuit for each half cycle of the exciting oscillations for the reasons explained in the aforementioned Wrathall patent. There will be a positive and a negative peak for each cycle, these occurring near the time when the magnetizing force on the coil, i. e., the current in its winding, passes through zero. The time spacing between these voltage peaks will be uniform.

As disclosed in the aforementioned Manley patent and illustrated by the curves in several figures thereof, particularly in Fig. 4, the application of a direct current bias to the magnetic core coil in such a pulse generating circuit will have the effect of shifting the time of occurrence of the voltage peaks or pulses by an amount which is proportional to the instantaneous value of the biasing direct current voltage, the direction of the shift depending on the direction of the biasing current flow through the coil. This characteristic of saturable magnetic core coils is made use of in accomplishing the purpose of the invention as will be pointed out in the following description of the alternative modifications illustrated by the schematic circuits of Figs. 1 and 2.

In the modification of Fig. 1, there are two identical pulse generating circuits of the type described above. One includes an impulse coil 1 with an open saturable magnetic core as diagrammatically illustrated, and a single winding on that core. The coil is excited by a source 2 of sinusoidal oscillations of a given fundamental frequency $f$ connected across the coil winding through the series resonant circuit 3 tuned to that frequency. The output circuit for the coil 1 includes the capacitor 4 and resistor 5 connected in series across the coil winding in parallel with the exciting source 2. The other pulse generating circuit contains identical elements identified by the same reference numbers followed by a prime (') mark. The resistors 5 and 5' in the output circuits of the two pulse generators in Fig. 1 are connected in differential opposing relation in the input of a suitable amplifier-detector 6 the output of which is connected to a meter 7.

The two pulse generators and associated circuits, as shown in Fig. 1 or 2, would be mounted on a float, vessel or other structure or carrier in such manner that the two impulse coils I and I' are maintained in fixed spaced relation with respect to each other and as far apart as possible. The open cores of the two coils I and I' may comprise cylindrical rods made up of laminated strips of an easily saturable magnetic material, such as one containing about 4 per cent molybdenum, about 21 per cent iron and about 75 per cent nickel, the magnetic strips having been properly heat treated and mounted in the core so as to be maintained without strain. The ratio of length of the cylindrical core to its diameter should preferably be great enough to avoid excessive flux reduction by the free poles at the ends of the core strips.

The polarization or bias of the coils I and I', instead of being provided by a direct current battery as in the coil bias in the circuit of the aforementioned Manley patent, is supplied by the surrounding earth's magnetic field. That field, in the absence of any large mass of magnetic material in the vicinity of the two coils, would be quite uniform so that the magnetic bias on the impulse coils I and I' due to the field strength at their locations would be substantially the same. Then, if the two exciting voltage sources 2, 2' of fundamental frequency $f$ for the two generators are properly synchronized in any suitable manner, such as by employing a common source and associated phase shifters as indicated in the alternative device of Fig. 2, the corresponding voltage peaks or pulses in the two impulse waves respectively produced in the output resistors 5 and 5' of the respective generators will be in phase with each other. As a result, the voltage drops across the two resistors 5 and 5' connected in opposition in the differential input circuit of the amplifier-detector 6 at any instant will balance each other so that there will be no indication on the meter 7 in the output of that amplifier-detector.

If desired, the negative peaks or pulses in the impulse wave generated by each pulse generator may be eliminated by connecting a suitably poled rectifier across the winding of the impulse coil as disclosed in the copending patent application of E. Peterson, Serial No. 354,351, filed August 27, 1940, which issued as Patent No. 2,284,444 on May 26, 1942.

Now, let it be assumed that a large magnetic body, such as a submarine, approaches the point where the two pulse generators are located, or that the float, vessel or other supporting structure of these generators is brought into the vicinity of the submarine or other large magnetic body. When the situation of the magnetic body with respect to the two pulse generators is such as to appreciably change the relative strength and shape or effective direction of the earth's magnetic field at the locations of the two impulse coils, there will be a relative variation in the magnetic condition of the latter, the amount and direction of this variation depending on which impulse coil is closer to the magnetic body and the relative distances of the respective impulse coils from the magnetic body and on the shape of the distorted field. This will cause a corresponding shift in the relative time of occurrence of the series of pulses produced by the two pulse generators, as indicated in the upper curves of Fig. 3 where the solid curve A represents the voltage wave produced by one generator and the dash-line curve B that of the other.

The lower curve C of Fig. 3 represents the difference obtained graphically between in-phase portions of one positive pulse of the wave A produced by one generator and the corresponding relatively shifted positive pulse of the wave B produced by the second generator, or the difference voltage produced when these portions of the pulses as they appear in the resistors 5 and 5', respectively, of Fig. 1, are applied in phase opposition in the differential input circuit of the amplifier-detector 6, the resulting difference voltage component being amplified and detected in the latter and causing an indication in the meter 7, indicating the proximity of the large magnetic body. It might be desirable to make the input circuit of the amplifier-detector 6 selective so that it will amplify only the fundamental frequency and the first few harmonics of the input wave, or preferably it might be tuned to an appropriate high harmonic with frequency $$\simeq \frac{1}{t}$$

where $t$ is the time duration of the voltage pulse produced by each generator (see Fig. 3, upper curve). For greater protection against circuit noise, the amplifier 6 would be switched in any suitable manner out of circuit during that part of the interval during which no pulse is being received. The phase shift between each succeeding two corresponding voltage pulses of the two pulse generators will be in like manner indicated by a reading on the meter 7, the varying magnitude of this reading, as the relative position of the magnetic body and the impulse coils changes, giving a more accurate picture of the location of the former as determined from the distortions produced in the earth's field in the vicinity of the magnetic body.

It will be seen from Fig. 3 that if the duration of each positive pulse is $t$ the difference between the two positive pulses as indicated in the lower curve has a fundamental frequency in the neighborhood of $$f=\frac{1}{t}$$

and its magnitude at the start is roughly linearly proportional to the time displacement ($\Delta t$) between the two pulses. At the full displacement, the fundamental would correspond to $$\frac{1}{2t}$$

However, the change in generator output with the biasing voltage applied to the impulse coil is small in this region, and the most favorable region for detecting small displacements would probably be close to the first figure given.

The alternative device of Fig. 2 differs essentially from that of Fig. 1 in the following particulars. Impulse coils 10, 10' having closed magnetic cores on which are wound a primary, a secondary and a magnetizing winding are respectively substituted for the open core coils with a single winding, I and I', illustrated in Fig. 1. A single source 20 of oscillations of the fundamental frequency $f$ is employed for exciting both impulse coils 10, 10', instead of separate synchronized sources as illustrated in Fig. 1, the source 20 being connected through a phase shifter 15 or 15', an amplifier 11 or 11' and the resonant circuit 3 or 3' tuned to the frequency $f$ of the source 20, to the primary winding of the impulse coil 10 or 10', respectively, and the secondary windings of the respective coils being connected across the capacitor-resistor output circuits 4, 5 and 4', 5', respectively, corresponding to the same elements in the circuit of Fig. 1.

The use of closed saturable magnetic cores for the impulse coils 10 and 10' in the device of Fig. 2 requires a method for generating direct current polarizing voltages proportional to the effective strength of the earth's magnetic field at the coil locations. These direct current polarizing voltages are obtained by synchronously rotating the wire loops 12 and 12' at the respective coil locations in the earth's magnetic field by means of the common motor 14 driven at a suitable constant speed. The voltages generated in the loops 12 and 12', respectively, are amplified and detected in amplifier-detector 13 and 13', respectively, and are then supplied to the magnetizing windings of the respective coils 10 and 10'. The phase shifters 15, 15' and the variable taps on the resistors 5 and 5' provide means for making zero adjustment for the two pulse generators. Otherwise, the device of Fig. 2 operates like that of Fig. 1 described above.

Various modifications of the circuits such as illustrated and described above which would be within the spirit and scope of the invention will occur to persons skilled in the art.

It is apparent that any other means of measuring phase shift well known in the art could be employed for indicating the shift in time of occurrence of the pulses generated by the two pulse generators in the systems of Figs. 1 and 2 in place of the differential input amplifier-detector illustrated.

What is claimed is:

In a system for detecting concealed bodies of magnetic material, two identical induction coils each having a saturable magnetic core, means supporting said coils spaced apart from each other by a substantial fixed distance, an equivalent output circuit comprising a capacitor and a resistor in series connected across each coil and so designed in combination with the coil to produce sharply peaked voltage pulses when the latter is suitably energized, means to apply each coil synchronized alternating current waves of the same frequency and of sufficient amplitude to drive it well beyond its saturation point, thereby producing in the output circuit for each coil a series of sharp voltage pulses with the same time spacings therebetween, each pulse having a duration which is less than one-half that of a half cycle of the exciting wave, each of said coils being magnetically polarized through its magnetic core in accordance with the strength and shape of the earth's magnetic field at substantially the coil location, the equal polarizations of the two coils when said field is uniform causing the corresponding pulses generated by the two coils to be in phase, the relatively unequal polarizations of the two coils when said field is distorted by a sufficiently large magnetic body in closer proximity to one coil than to the other causing corresponding pulses generated by the two coils to be shifted proportionally in phase with respect to each other, the resistors in the output circuits of the two coils being connected in differential opposing relation so that the voltage drops produced therein by the generated pulses are effectively subtracted from each other, and means to indicate the direction and amount of any instantaneous voltage differences resulting from such subtraction.

OLIVER E. BUCKLEY.

REFERENCES CITED

The following references are of record in the file of this patent:

UNITED STATES PATENTS

| Number | Name | Date |
|---|---|---|
| 2,252,059 | Barth | Aug. 12, 1941 |
| 2,016,977 | Thomas | Oct. 8, 1935 |
| 2,047,609 | Antranikian | July 14, 1936 |
| 2,238,072 | Nelson et al. | Apr. 15, 1941 |